[72] Inventor Lawrence A. Rempert Cranbury, N.J.
[21] Appl. No. 811,913
[22] Filed Apr. 1, 1969
[45] Patented Dec. 21, 1971
[73] Assignee RCA Corporation

[54] DIGITAL SYNCHRONIZATION SYSTEM

8 Claims, 4 Drawing Figs.

[52] U.S. Cl. 178/69.5 R, 328/155
[51] Int. Cl. H04l 7/00
[50] Field of Search 178/69.5 R; 328/63, 72, 155; 307/269

[56] References Cited

UNITED STATES PATENTS

| | | | |
|---|---|---|---|
| 3,147,342 | 9/1964 | Chojnowski et al. | 178/69.5 X |
| 3,461,239 | 8/1969 | Widl | 178/69.5 R |
| 3,582,789 | 6/1971 | Mick | 178/69.5 R |

*Primary Examiner*—Robert L. Richardson
*Attorney*—H. Christoffersen

ABSTRACT: A system for automatically adjusting a receiver to the "format" of received characters. The format refers to the number B of bit transmission intervals per character and the duration $\Delta t$ of each such interval, where B is unknown and is in the range $B_0$ to $B_m$ and $\Delta t$ is unknown and is in the range $\Delta t_0$ to $\Delta t_m$. In response to the reception of timing signals of duration $B_0\ \Delta t$, where only $B_0$ is known in advance, the system generates clock pulses spaced intervals $\Delta t$. In the response to the reception of timing signals of duration $B\ \Delta\ t$, after $\Delta t$ has been ascertained by the system, it generates B such clock pulses for each subsequently received character, each clock pulse concurrent with a character bit interval.

INVENTOR
Lawrence A. Rempert

BY [signature]

ATTORNEY

INVENTOR
Lawrence A. Rempert
BY Samuel Cohen
ATTORNEY

INVENTOR
Lawrence A. Rempert

BY Samuel Cohen

ATTORNEY

DIGITAL SYNCHRONIZATION SYSTEM

BACKGROUND OF THE INVENTION

Data transmission between two data-processing systems normally involves dividing the total amount of information to be transmitted into groups of binary digits (bits) known as characters. The "format" of these characters generally is known in advance by the receiving system and this makes it possible for the receiving system to accept the bits at their bit repetition frequency and to understand their meaning, for example, whether they are control or information bits.

In the serial mode of transmission, there may be a single channel and the bits of each character may be sent one-by-one down this channel, in sequence The relative times of occurrence, within a character transmission interval, of the information and the control bits and the duration of each such bit, that is, the speed of transmission of the character, are characteristics which define the character format.

FIG. 1 shows one typical character format. Each character interval starts with a "start" bit (which is a "control" bit) of duration $\Delta t$, and the start bit is followed by N information bits, each also of duration $\Delta t$. Each information bit in the example given may be positive-going and represent the binary digit 1 or may be of zero amplitude and represent the binary digit 0. (This convention, of course, is purely arbitrary). Typically, N may be some number from say six to 12 bits so that the duration of the control (start) bit (assuming only one such control bit is present) plus the N information bits may be in the range $B_0 \Delta t$ to $B_m \Delta t$, where $B_0$ may be equal to 7 and $B_m$ to 13.

After the interval B $\Delta t$, where in this example B=N+1, there is a second interval M$\Delta t$ known as the end bit interval. During this interval, no data is transmitted, that is, the data channel can be considered to be in the zero state. The purpose of this interval is to provide time to acknowledge the receipt of the character by the receiving system as well as to provide a minimum space between characters. Thus, one complete character interval has a duration (N+1)$\Delta t$+M$\Delta t$, as shown in FIG. 1. Immediately after the character interval, the next character may be sent, as illustrated in FIG. 1, or, there may be an idle period between successive characters or between successive groups of characters (messages). For example, when the transmitter is a teletype set, there is an idle period (the time between the depression of successive keys) between successive characters.

In some modern data-processing systems which include many remote transmitters connected to each receiver system, there may be a number of different transmitted character formats. For example, the transmitting frequencies, that is, the bit durations and the number N of bits per character may be different at different transmitters. The object of the present invention is to provide a system of this type in which the receiver automatically adjusts to the different formats.

BRIEF SUMMARY OF THE INVENTION

In response to the reception of timing signals of duration $B_0$ $\Delta t$, where $B_0$ is known in advance and is the minimum number of bit intervals within a character transmission time during which intelligence is transmitted, the system of the present invention generates clock pulses spaced intervals $\Delta t$. In a preferred form of the invention, the system also includes means responsive to the reception of a timing signal of duration B $\Delta t$, after $\Delta t$ has been ascertained by the system, for generating B clock pulses for each subsequently received character, each clock pulse concurrent with a character bit interval.

DETAILED DESCRIPTION

Figure 3:
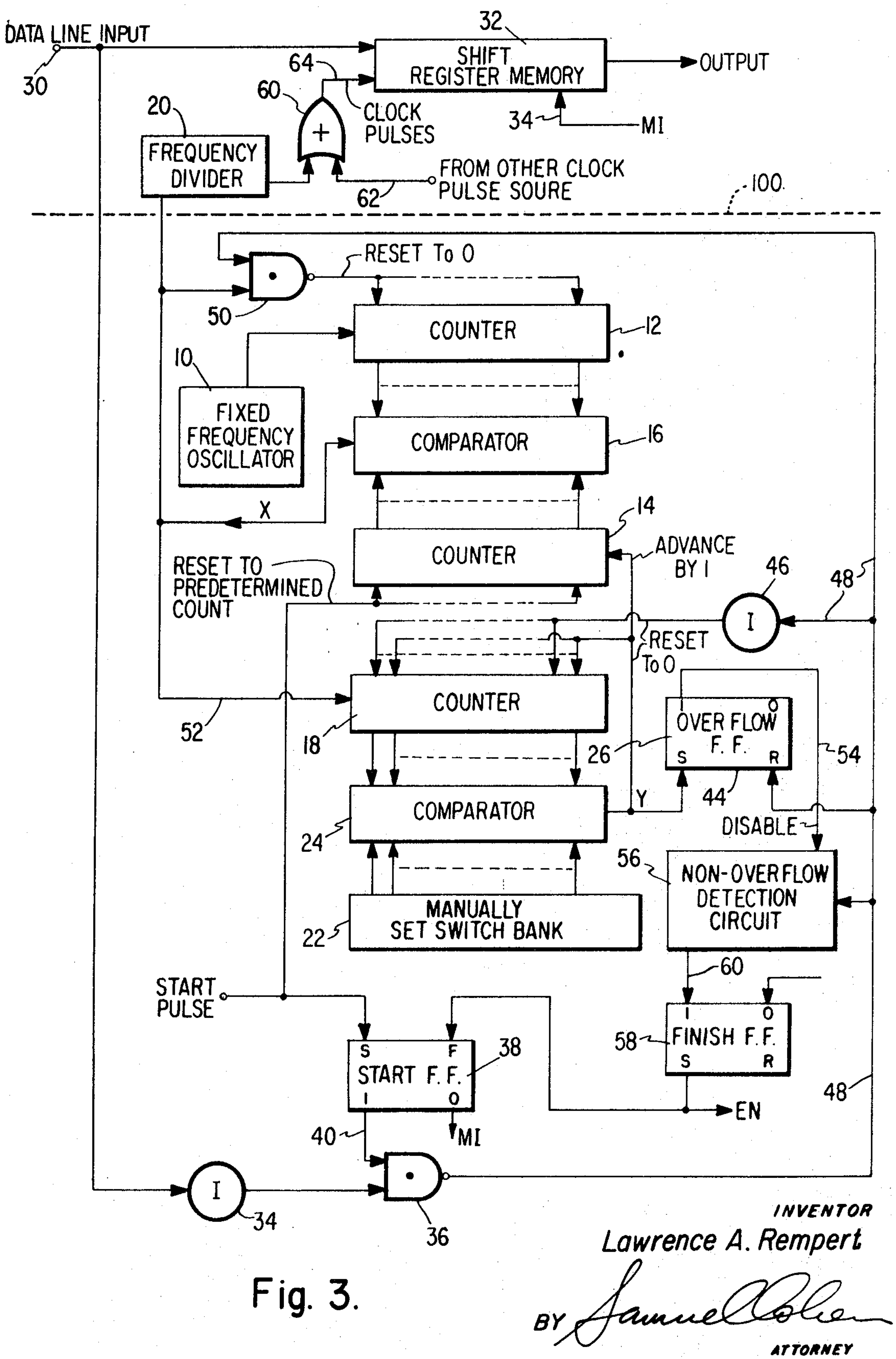
FIG. 3 is a block diagram of a form of the invention which automatically adjusts to the bit duration.

The system of FIG. 3 includes a fixed-frequency oscillator 10 which supplies pulses to be counted to first counter 12. The count produced by the first counter 12 is compared with the count present in the second counter 14 by a comparator 16. The comparator 16 produces output pulses X which are applied to a third counter 18 to a frequency divider 20 and to gate 50. The count produced by the counter 18 is compared with the preset count in the manually set switch bank 22 by a comparator 24. The pulses Y produced by comparator 24 are applied to overflow flip-flop 26 and are also employed to reset the third counter 18 and to advance by one the count stored in second counter 14.

Figure 1:
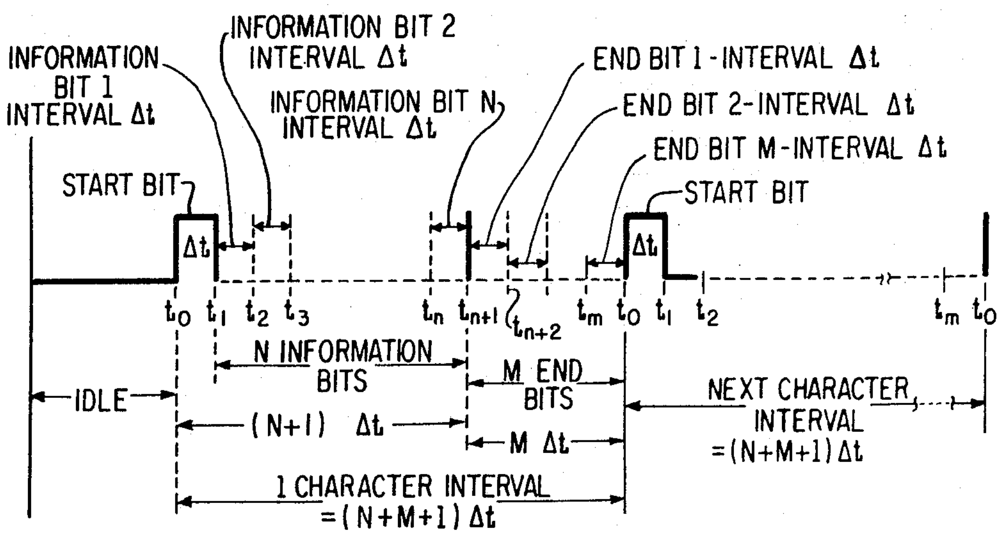
FIG. 1 is a drawing illustrating a typical character format.
Figure 2:
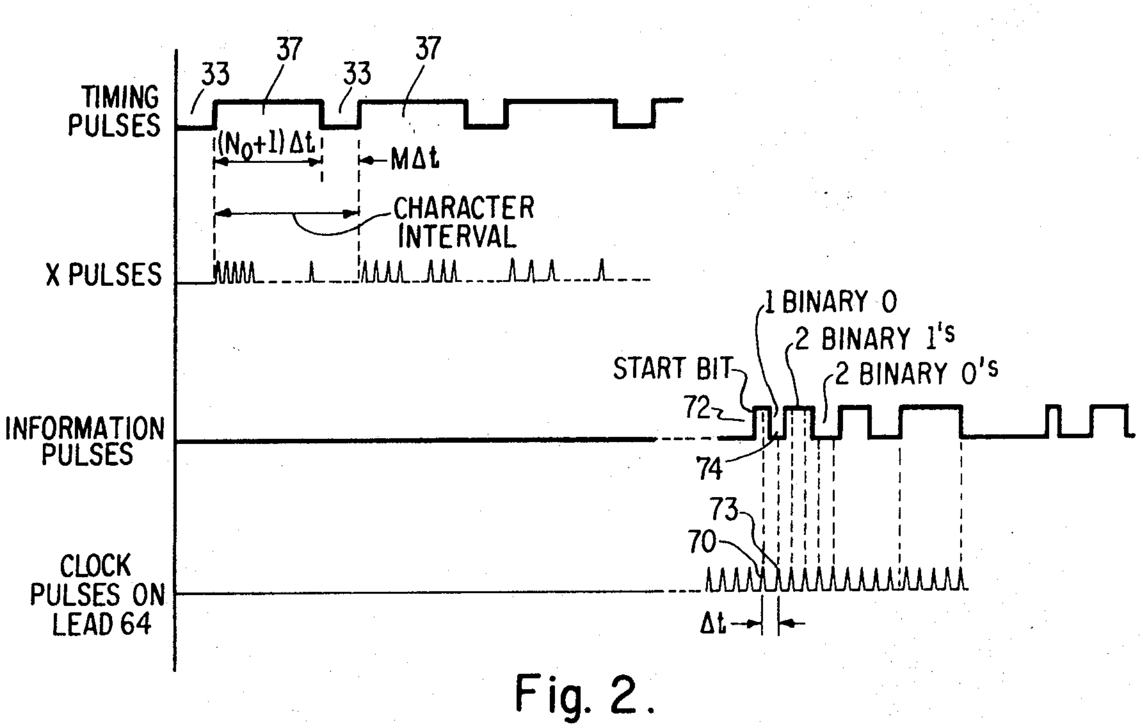
FIG. 2 is a drawing of waveforms to help explain the operation of the system of the invention.

In the operation of the system of FIG. 3, to start with, rather than sending characters as shown in FIG. 1, the remote transmitter (not shown) sends timing pulses 37 such as shown in FIG. 2. Each timing pulse 37 has a duration ($N_0$+1)$\Delta t$ and each interval between timing pulses has an interval M $\Delta t$, as shown. $N_0$ represents the minimum number of bits per character any transmitter can send. In the present system, $N_0$=N=8, that is, the assumption is made that N is the same for all transmitters and does not change. $\Delta t$, however is not the same for all transmitters. The assumption is made, in the present example, that for the particular transmitter involved, that $\Delta t$=0.001 seconds and also that M=1. The present system automatically adjusts its parameters so that it generates clock pulses at lead 64 which are separated by an interval $\Delta t$, which in the present example is 0.001 seconds, in the manner explained below.

The timing pulses 37 are applied to input terminal 30. During this period, shift register memory 32 can be considered to be disabled, for example, by the signal MI applied to line 34. The timing pulses are also applied via inverter 34 to one input terminal of gate 36. This gate produces a negative-going output signal when both of its inputs are positive-going.

To start the system, a start pulse is applied to the set terminal of flip-flop 38. This pulse may be produced by local control equipment and may be derived, for example, from a "request for service" by a remote transmitter. This pulse sets the flip-flop so that a priming signal (a positive voltage level) is applied from the 1 output terminal of the flip-flop via lead 40 to gate 36. The start pulse is also applied via line 42 to certain terminals of counter 14 to preset the counter to some predetermined count. A specific example is given later.

When the first negative-going pulse 33 is applied to the data line input terminal 30, AND-gate 36 becomes enabled and it applies a negative-going reset signal directly to overflow flip-flop 44 and a reset signal via inverter 46 to the counter 18. The inverter converts the negative-going signal on line 48 to a positive-going signal and the positive-going signal resets the counter 18 to zero.

The negative-going signal on line 48 is also applied to gate 50. This disables the gate and the latter thereupon applies a positive-going reset pulse to counter 12 resetting counter to zero. During the application of this reset pulse to counter 12, the fixed-frequency pulses from oscillator 10 cannot advance the counter. Upon termination of a negative-going pulse 33, the positive-going timing pulse 37 starts. This pulse is known to have a duration equal to that of $N_0$+1 information pulses, however, as the system does not know in advance the value of $\Delta t$, (one-bit interval) it does not know the value of ($N_0$+1)66 t. Pulse 37 disables gate 36 so that a positive-going signal is now present on line 48. The reset signal is therefore removed from counter 18 and AND-gate 50 is enabled. The reason is that the X-output of comparator 16 is normally relatively positive as is the signal on lead 48 so that a relatively negative signal is present at the reset terminals of counter 12.

The counter 12 now starts counting the fixed-frequency pulses produced by oscillator 10. Each time the count stored in counter 12 becomes equal to the count stored in counter 14, the comparator 16 produces a negative-going output pulse. This negative-going output pulse disables gate 50 and this causes the gate to apply a positive reset pulse to counter 12, resetting the counter to zero.

The successive pulses X produced by the comparator are applied via line 52 to the counter 18. Counter 18 counts these pulses and each time the count in counter 18 reaches the count stored in the switch bank 22, the comparator produces an output pulse Y. The output pulse Y sets the overflow flip-flop 44 and the latter applies a disabling signal, via line 54, to the nonoverflow detection circuit 56. Pulse Y is also applied to counter 14 and causes the count stored in the counter to advance by one. Thus, each time a pulse Y is generated, the repetition frequency of the pulse X is reduced.

The process described above continues for the duration of one timing pulse 37, that is, for an interval $(N_0+1)\Delta t$. If at the end of this interval the overflow detection flip-flop 26 is set (as it will be if even a single pulse Y is produced) then the next negative-going input pulse 33 (that is the negative-going period between timing pulses 37) will cause the overflow flip-flop 26 to be reset. The negative-going pulse corresponding to 33 which is present on line 48, also is applied to the nonoverflow detection circuit but will have no effect on this circuit as it is maintained disabled by the direct current level present on line 54. A pulse on line 60 will occur only if line 54 is still enabled at the start of period 33 (a negative transition on line 48).

In due course, generally after a number of timing periods 37, the pulse repetition frequency of the pulses X will be reduced sufficiently so that no pulse Y is produced during a timing pulse 37. This means that the overflow flip-flop 44 will remain in its reset state. When this condition exists, the next time a pulse 33 occurs, the nonoverflow detection circuit is enabled via line 48 and applies a set signal, via line 60, to "-finish" flip-flop 58. The output EN produced by the finish flip-flop is an indication that the pulses X are at the desired frequency. This signal is employed to reset the start flip-flop which, in turn, enables the shift register memory. It may also be employed to signal the remote transmitter that the transmission of characters can start.

The transmitted characters are now applied to data input terminal 30. The X-pulses produced by the comparator 16 are applied to a fixed-frequency divider 20 which divides these pulses to a frequency equal to the bit repetition rate of the data bits. These pulses, applied via OR-gate 60 to the shift register, clock the input data bits into the shift register memory.

After a sufficient number of characters have been accumulated the shift register memory 32, they may be clocked out of the register at a different frequency. The clock pulses at this different frequency may be derived from the local data-processing machine (not shown) and may be applied via line 62.

In one practical embodiment of the invention, N, the number of bits per character, is 8 and the periods $\Delta t$ are each 0.001 seconds. Thus, the timing period $(N+1)\Delta t$ is equal to 0.009 seconds, or, put another way, the timing period includes 9-bit times which recur at a frequency of 1 kilohertz. The fixed frequency oscillator produces pulses at a 1 megahertz repetition rate. The manually set switch bank 22 is set to a count of 91. (In one practical system this count is permanently wired in.) The counter 14 initially is set to a count of 9. It requires 65 timing pulses 37 for the pulses X to reach the desired frequency—a total adjustment time of 0.65 seconds (slightly more than one-half second). When in final adjustment, the counter 14 has advanced to a count of 100. The pulse repetition frequency of the pulses X is reduced to 10 kilohertz, the frequency divider 20 divides this frequency by 10 to produce clock pulses at a 1-kilohertz rate. During each timing pulse, nine such clock pulses are produced, one per bit time.

FIG. 2 shows information pulses applied to terminal 30 and the clock pulses on lead 64. Note that each clock pulse is centered on an information pulse, the clock pulse 76 for example, is centered on the start bit 72, the clock pulse 73 is centered on the first information bit 74 which in this instance is a 0 and so on. One means for accomplishing this is discussed later in connection with FIG. 4.

In the practical example given above, $N_0$=8 and the manually set switch bank 22 initially is set to a count of 91. It is found, in practice, that the general rule to be followed to accommodate any reasonable character format is to set the switch bank 22 to the count of $10(N_0+N_S)+1$ where:

$N_0$ = lowest number of information bits ever expected to be received in any data format, and $N_S$ = the number of start bits.

In practicing the present invention, it is found that there is a trade off between accuracy and generality. Theoretically, for example, $N_0$ can be 1 and the timing period can have a duration of only $2\Delta t$. This would permit any value of N to be handled because the timing period would consist of the start bit and the first information bit. However, the shorter the timing period, the less accurate the frequency adjustment and the longer the adjustment will take.

The system described above will operate for any value of $\Delta t$ within the range $$10(10)/F_0 \leq \Delta t \leq 10(C_{max})/F_0$$

where:

$F_0$ = the frequency of the fixed-frequency oscillator 10

$C_{max}$ = the maximum count possible of counter 12

In general, the larger $C_{max}$, the longer the frequency adjustment time, for adjustments were $C$ approaches $C_{max}$. In practice $F_0$ and $C_{max}$ are chosen to best accommodate a "reasonable" $\Delta t$ range. For example, the following equations may be followed $$C_{max}=10(\Delta t_{max}/\Delta t_{min})$$

$$F_0=100/\Delta t_{min}$$

For example, if a reasonable expected range of $\Delta t$ is:

$$\Delta t_{min}=0.0001 \leq \Delta t \leq 0.01=\Delta t_{max}$$

In other words, the expected bit repetition frequency is somewhere in the range of 10,000 bits per second to 100 bits per second—a reasonably large range.

For this example, since $$10(\Delta t_{max}/\Delta t_{min})=10(0.01/0.001)=100=C_{max}$$

Counter 12 could be a 3-decade counter and $$F_0=100/\Delta t_{min}=100/0.001=MH_z.$$

The various blocks in the system of FIG. 3 are in themselves known and need not be discussed in detail. As one example, the block 56 may be a standard integrated circuit monostable multivibrator in which line 54 is connected to the gate terminal, line 48 to the trigger terminal and line 60 to the output terminal. The flip-flops and counters also may be standard integrated circuits. The fixed-frequency oscillator need not be extremely stable, that is, it need not either be crystal controlled or placed in an oven. The oscillator should have sufficient short term stability that its frequency does not vary substantially during a character interval or, in the case of a message, during the message interval.

As already mentioned, in the circuit of FIG. 3 no provision is made for different values of N. If, however, the portion of the system of FIG. 3 above the dash line 100 is replaced with the circuit of FIG. 4, then the system automatically adjusts both to frequency, that is, to different values of $\Delta t$, and to N, that is, to the number of bits per character.

Figure 4:
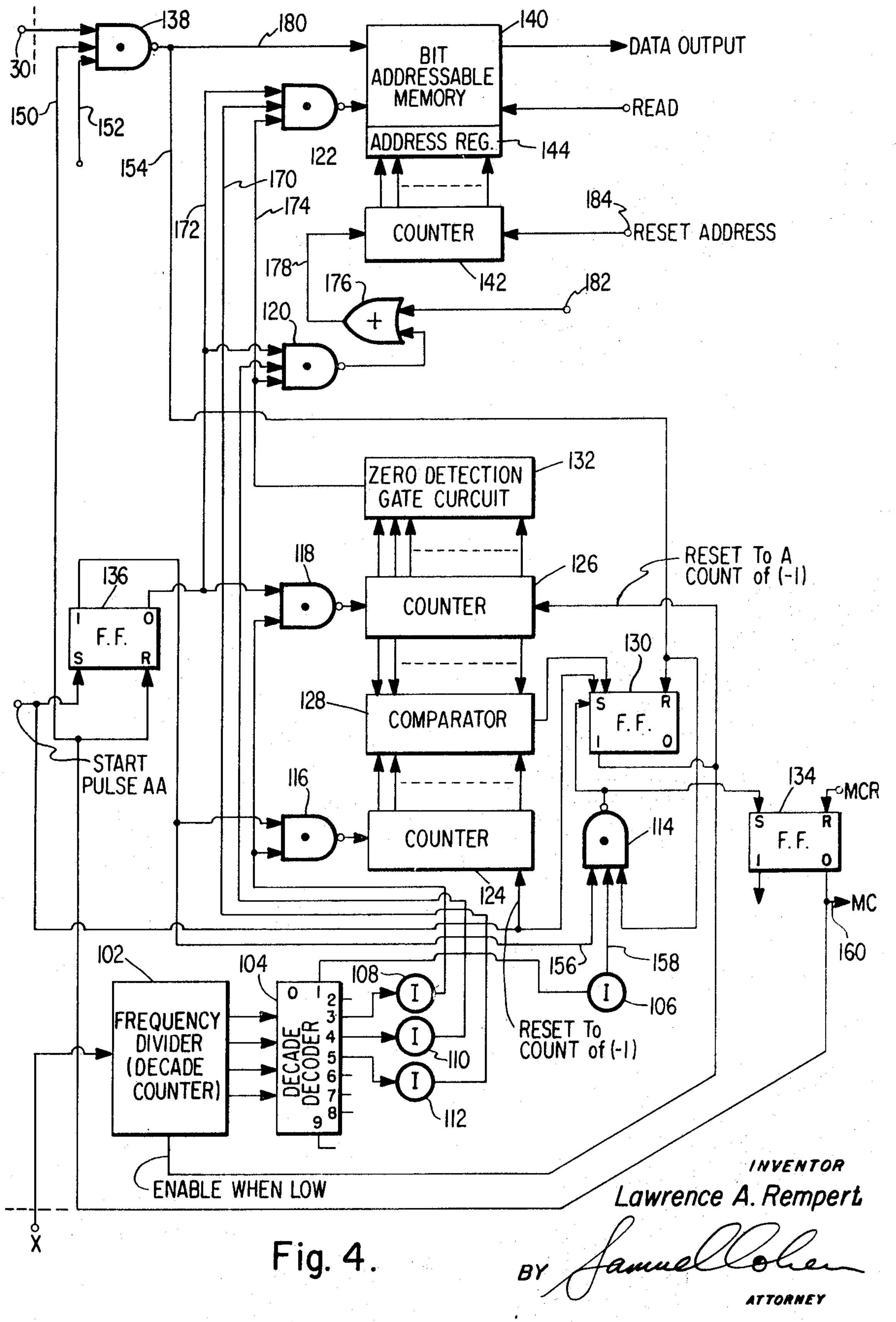
FIG. 4 is a block diagram of a modification of the system of FIG. 3 that permits the system also to adjust to N, the number of bits per character.

The system of FIG. 4 includes a frequency divider 102 which corresponds to the frequency divider 20 of FIG. 3 whose output is applied to a decade decoder 104. In this combination, the frequency divider may simply be a decade counter. The 1, 3, 4, and 5 count output terminals of the decade decoder are applied via inverters 106, 108, 110, and 112 to AND-gate 114, AND-gates 116 and 118, AND-gate 120 and AND-gate 122, respectively, AND-gate 116 is connected to counter 124 and AND-gate 118 to counter 126. The counts produced by these two counters are compared by comparator 128 and when they are equal the comparator produces a set signal which it applies the flip-flop 130.

The counter 126 is connected also to a zero detection gate circuit 132 which applies its output to AND-gate 122. AND-gate 114 is connected to the set terminals of flip-flop 130 and 134. The circuit of FIG. 4 also includes a second start flip-flop 136 whose 1 output terminal is connected to AND-gate 116 and whose 0 output terminal is connected to AND-gate 118. The data line input terminal 30 is connected via AND-gate 138 to a bit addressable memory 140. This memory is addressed by means of the counter 142 and the address register 144 of the memory.

In the operation of the system of FIG. 4, the portion of the system shown beneath the dashed line 100 in FIG. 3 first adjusts the system of the bit duration $\Delta t$. After this, the control system generates a second start pulse AA which sets the flip-flop 36. This start pulse AA may be generated, for example, in response to the output EN of the finish flip-flop 58 of FIG. 3. The control system may then signal the remote transmitter to send another timing pulse. This timing pulse will have a duration $(N+1)\Delta t$. It will be recalled that the first group of timing pulses had a duration of $(N_0=1)\Delta t$ which in the example given was $(8=1)\Delta t$. For purposes of the present discussion, it may be assumed that the present timing pulse has N equal to 10 so that N=1=11. This timing pulse is sent from the remote transmitter via the data line to input terminal 30. Two of the input leads 150 and 152 may be assumed initially to be at relatively high levels so that the gate 138 is primed. Accordingly, in response to the leading edge of this timing signal at terminal 30, the output lead 154 goes low. The low signal resets flip-flop 130 and the low output present at the one output terminal of the flip-flop thereupon enables the frequency divider 102.

The output pulses of the frequency divider are decoded by the decade decoder 104 and each 10 such pulses X which occur, a negative pulse is applied from terminal 30 of the decoder to the inverter 108 and the latter applies a positive pulse to AND-gates 116 and 118. As flip-flop 136 is set, AND-gate 116 is primed and AND-gate 118 is disabled. Accordingly, counter 124 advances its count by 1 in response to each count of 3 produced by the decoder 104.

For reasons which will become clear shortly, the counter 124 initially is reset to a count of −1. When the counter has counter 11 pulses, that is, when it reaches a count of +10, the timing pulse of duration $(N+1)\Delta t$ on data line terminal 30 ends. This disables gate 138 and the positive pulse present at lead 134 is applied to AND-gate 114. At this time, the second input lead 156 also carries a relatively positive level in view of the set condition of flip-flop 136. A short time later, a negative-going signal indicative of the count of 1 is produced by the decoder 104 so that the inverter 106 applies a positive signal to lead 158. This enables AND-gate 114 and the latter produces a negative set signal which it applies to the flip-flop 130.

The set flip-flop 130 produces a high output at its 1 output terminal and this disables the frequency divider 102 and resets counter 126 to a count of −1. The negative output of AND-gate 114 also sets flip-flop 134. The corresponding negative signal produced at the 0 output terminal of flip-flop 134 resets flip-flop 136 and serves also to disable AND-gate 138. The reset flip-flop 136 now disables AND-gate 116 and primes AND-gate 118.

In response to the conditions above, the system is now ready to receive information. In response to this condition, which may be communicated to the computer central control system (not shown) via lead 160, a reset signal MCR is applied to flip-flop 134. This causes its 0 output terminal again to go high and the high signal again primes AND-gate 138. The high signal has no effect on flip-flop 136.

Assume now that the first character is sent via the data line to terminal 30. The first pulse is a control bit, that is, the start bit and it causes a negative pulse to be produced at lead 134 which resets flip-flop 130. The low signal produced by the flip-flop thereupon resets counter 126 to a count of −1 (actually the counter already is reset) and also enables the frequency divider 102. Now each time the decade decoder reaches a count of 3, the pulse to be counted is applied via AND-gate 118 to counter 126.

In response to first such pulse, which occurs during the start bit interval, the counter 126 is advanced to a count of 0. The zero count detection gate circuit 132 detects this count and in response thereof disables AND-gates 120 and 122. Thus, the counter 142 is prevented from being advanced and the disabled AND-gate 122 prevents the start bit from being written into the memory 140. However, each following bit interval $\Delta t$, counter 126 advances by 1 and a number of other things occur. For example, inverter 112 applies an enabling signal via lead 170 to AND-gate 122. Leads 172 and 174 are both high, representing a 1, at this same time so that AND-gate 122 applies a write pulse to the bit addressable memory. This write pulse is concurrent with the information bit and, in view of the fact that the write pulse occurs each time the count of 5 is produced by the decade decoder, the write pulse is centered on the information pulse.

One-tenth of a bit time $\Delta t$ prior to the time that the above occurs, inverter 110 applies an enabling signal to AND-gate 120. As already mentioned, the leads 174 and 172 are high at this time so that the AND gate applies an advance pulse via OR-gate 176 and lead 178 to counter 142. The counter is thereby advanced to the next count. This next count is indicative of the address in the memory at which it is desired to write the bit then present at lead 180 into the memory. This count is applied to the address register and one-tenth of a bit time later the bit is written into the memory in response to the write pulse produced by AND-gate 122.

The process above continues until the counter 126 has counter 11 pulses, that is, until the counter reaches a count of 10. At that time, the comparator 128 produces an output which sets the flip-flop 130. The set flip-flop disables the frequency divider and resets counter 126 to a count of −1. The system now waits until the next start bit occurs. When the next start bit does occur, indicating the start of another character, the entire process just described repeats with each received bit of the next character being clocked into the bit addressable memory.

As in the case of the system of FIG. 3, the memory 140 may be read out at a rate different than that at which it receives information. The readout pulses from another clock source may be applied to the system via terminal 182. The counter 142 also may be reset to some initial count via a locally generated signal applied to terminal 184. Also, the gate 138 may be disabled via a locally generated signal applied to lead 152.

What is claimed is:

1. A system for producing one clock pulse per bit of successive, serially transmitted characters, where each character transmission interval includes a duration $B\Delta t$ during which intelligence is transmitted, where B, which may be unknown, is the number of bit intervals and is in the range $B_0$ to $B_m$ and where $\Delta t$, which also may be unknown, is some value in the range $\Delta t_0$ to $\Delta t_m$ comprising, in combination:

means for transmitting timing signals, each of duration $B_0\Delta t$, where $B_0$ is known in advance;

means receptive of said timing signals for producing clock pulses at intervals $\Delta t$;

means for transmitting a timing signal of duration $B\Delta t$ after said clock pulses are produced at intervals $\Delta t$; and means receptive of said last-named timing signal for producing, during each succeeding character transmission interval, B clock pulses, each concurrent with a bit interval of a character.

2. In a system as set forth in claim 1, said means for producing clock pulses at intervals $\Delta t$ including:

first, second, and third counters;

a fixed frequency oscillator supplying pulses to be counted to the first counter;

means for producing an output when the counts in the first and second counters are equal and applying that output to the third counter; and means for advancing by one the count stored on the second counter each time the third counter reaches a given count.

3. In a system as set forth in claim 1, said last-named means including:

first and second counting means;

means producing pulses at intervals $\Delta t$ and applying them to said first counting means;

means for stopping said first counting means when it has counted B such pulses; and means for thereafter applying said pulses to said second counting means, and for resetting the same each time the counts in the two counting means are equal.

4. A system as set forth in claim 1, further including:

means for suppressing one clock pulse in each group of B clock pulses.

5. In a circuit for producing clock pulses at a frequency which is synchronous with that of received timing pulses, in combination:

an oscillator for producing signals at a frequency substantially higher than the repetition frequency of said timing pulses;

first counter means responsive to received timing pulses for counting, during the interval of each such timing pulse, the signals produced by said oscillator;

first count-indicating means for both resetting said first counter means and for producing an output signal X each time, during the interval of a timing pulse, said first counter means reaches a given count;

second counter means for counting, during the interval of each timing pulse; said output signals X;

second count-indicating means for both resetting said second counter means and for producing an output signal Y each time, during the interval of a timing pulse, said second counter means reaches a predetermined count;

means responsive to each second output signal Y for increasing by one the count to which said first count indicating means is responsive; and means for indicating when said last-named means ceases to produce at least one output signal Y during the interval of a received timing pulse.

6. In a circuit as set forth in claim 5, said first count-indicating means including a third counter means and means for comparing the count stored therein with the count of said first counting means.

7. In a circuit as set forth in claim 5, further including a frequency divider receptive of said pulses X for producing $n$ pulses each timing pulse interval, where $n$ is the number of bit intervals within said timing pulse interval.

8. In a circuit as set forth in claim 5, said last-named means comprising a flip-flop coupled to said second count-indicating means and means for sensing the state of said flip-flop.

* * * * *